(12) United States Patent
Hama et al.

(10) Patent No.: US 11,216,679 B2
(45) Date of Patent: Jan. 4, 2022

(54) BIOMETRIC AUTHENTICATION APPARATUS AND BIOMETRIC AUTHENTICATION METHOD

(71) Applicant: FUJITSU LIMITED, Kawasaki (JP)

(72) Inventors: Soichi Hama, Atsugi (JP); Yukihiro Abiko, Kawasaki (JP); Satoshi Maeda, Atsugi (JP)

(73) Assignee: FUJITSU LIIMITED, Kawasaki (JP)

( * ) Notice: Subject to any disclaimer, the term of this patent is extended or adjusted under 35 U.S.C. 154(b) by 120 days.

(21) Appl. No.: 16/698,018

(22) Filed: Nov. 27, 2019

(65) Prior Publication Data
US 2020/0202152 A1    Jun. 25, 2020

(30) Foreign Application Priority Data

Dec. 21, 2018    (JP) .............................. JP2018-239884

(51) Int. Cl.
*G06K 9/00* (2006.01)
*G06T 7/521* (2017.01)
*G06T 7/73* (2017.01)

(52) U.S. Cl.
CPC ..... *G06K 9/00885* (2013.01); *G06K 9/00013* (2013.01); *G06T 7/521* (2017.01); *G06T 7/73* (2017.01); *G06K 2009/00932* (2013.01); *G06T 2207/30196* (2013.01)

(58) Field of Classification Search
CPC ............ G06K 9/00885; G06K 9/00013; G06T 7/521; G06T 7/73
USPC ........................................................ 382/115
See application file for complete search history.

(56) References Cited

U.S. PATENT DOCUMENTS

| | | | |
|---|---|---|---|
| 9,952,036 B2 | 4/2018 | Bronstein et al. |
| 2002/0003892 A1 | 1/2002 | Iwanaga |
| 2002/0057832 A1 | 5/2002 | Proesmans et al. |
| 2006/0177107 A1 | 8/2006 | Ishii |
| 2010/0118123 A1 | 5/2010 | Freedman et al. |

(Continued)

FOREIGN PATENT DOCUMENTS

| | | |
|---|---|---|
| EP | 2 105 865 A2 | 9/2009 |
| EP | 3 091 4580 A1 | 11/2016 |

(Continued)

OTHER PUBLICATIONS

Extended European Search Report dated Apr. 23, 2020 from European Application No. 19211821.4, 6 pages.

*Primary Examiner* — Ayodeji O Ayotunde
(74) *Attorney, Agent, or Firm* — Staas & Halsey, LLP

(57) ABSTRACT

A living body sensor obtains a plurality of living body images along an authentication-target living body, and a shape sensor obtains shape information corresponding to each of the plurality of living body images. A processor determines a position of a part of the authentication-target living body captured in each of the plurality of living body images, according to the shape information corresponding to each of the plurality of living body images. The processor compares a biometric feature of each of the plurality of living body images and a registered biometric feature by using a determined position of the part of the authentication-target living body and performs authentication for the authentication-target living body according to a comparison result of comparing the biometric feature of each of the plurality of living body images and the registered biometric feature.

12 Claims, 12 Drawing Sheets

(56) References Cited

U.S. PATENT DOCUMENTS

| | | | | |
|---|---|---|---|---|
| 2011/0129128 A1* | 6/2011 | Makimoto | ......... | G06K 9/00013 |
| | | | | 382/124 |
| 2011/0274318 A1* | 11/2011 | Shindo | ............... | G06K 9/00912 |
| | | | | 382/115 |
| 2016/0275334 A1 | 9/2016 | Hama et al. | | |
| 2016/0328597 A1 | 11/2016 | Abiko et al. | | |
| 2017/0147863 A1 | 5/2017 | Semba et al. | | |
| 2017/0323130 A1* | 11/2017 | Dickinson | ................ | A61B 8/54 |

FOREIGN PATENT DOCUMENTS

| | | |
|---|---|---|
| JP | 2000-512012 A | 9/2000 |
| JP | 2002-24831 A | 1/2002 |
| JP | 2006-218019 A | 8/2006 |
| JP | 2006-277341 | 10/2006 |
| JP | 2016-173669 A | 9/2016 |
| JP | 2016-212636 A | 12/2016 |
| JP | 2017-97574 A | 6/2017 |
| WO | 2008/120317 A1 | 10/2008 |

\* cited by examiner

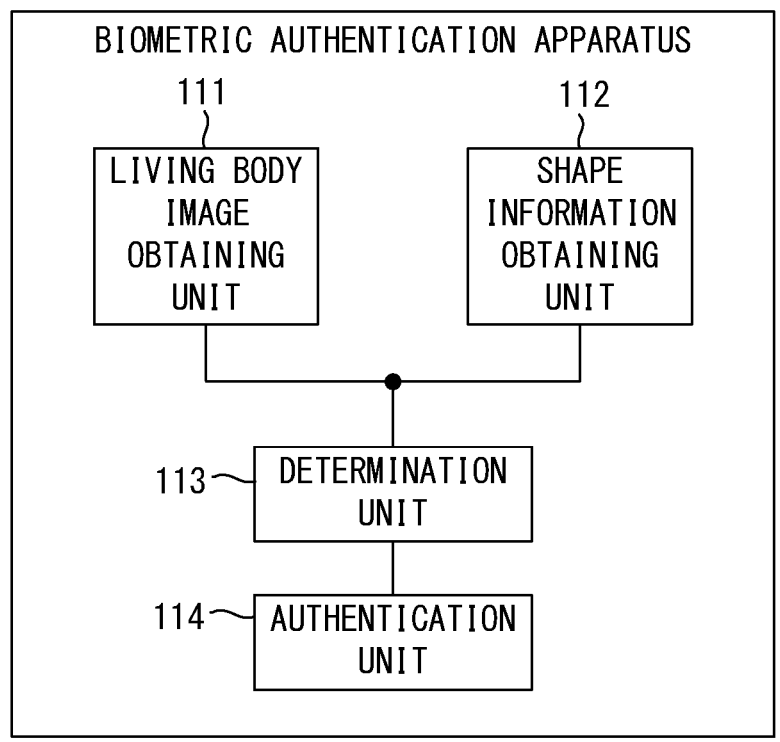
F I G. 1

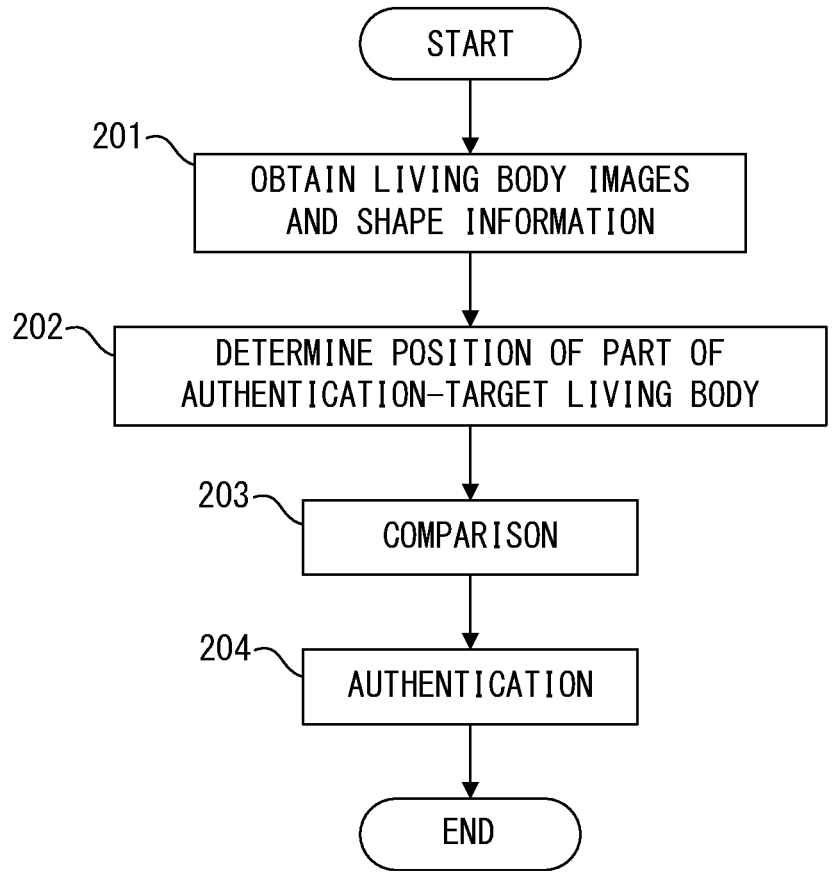
F I G. 2

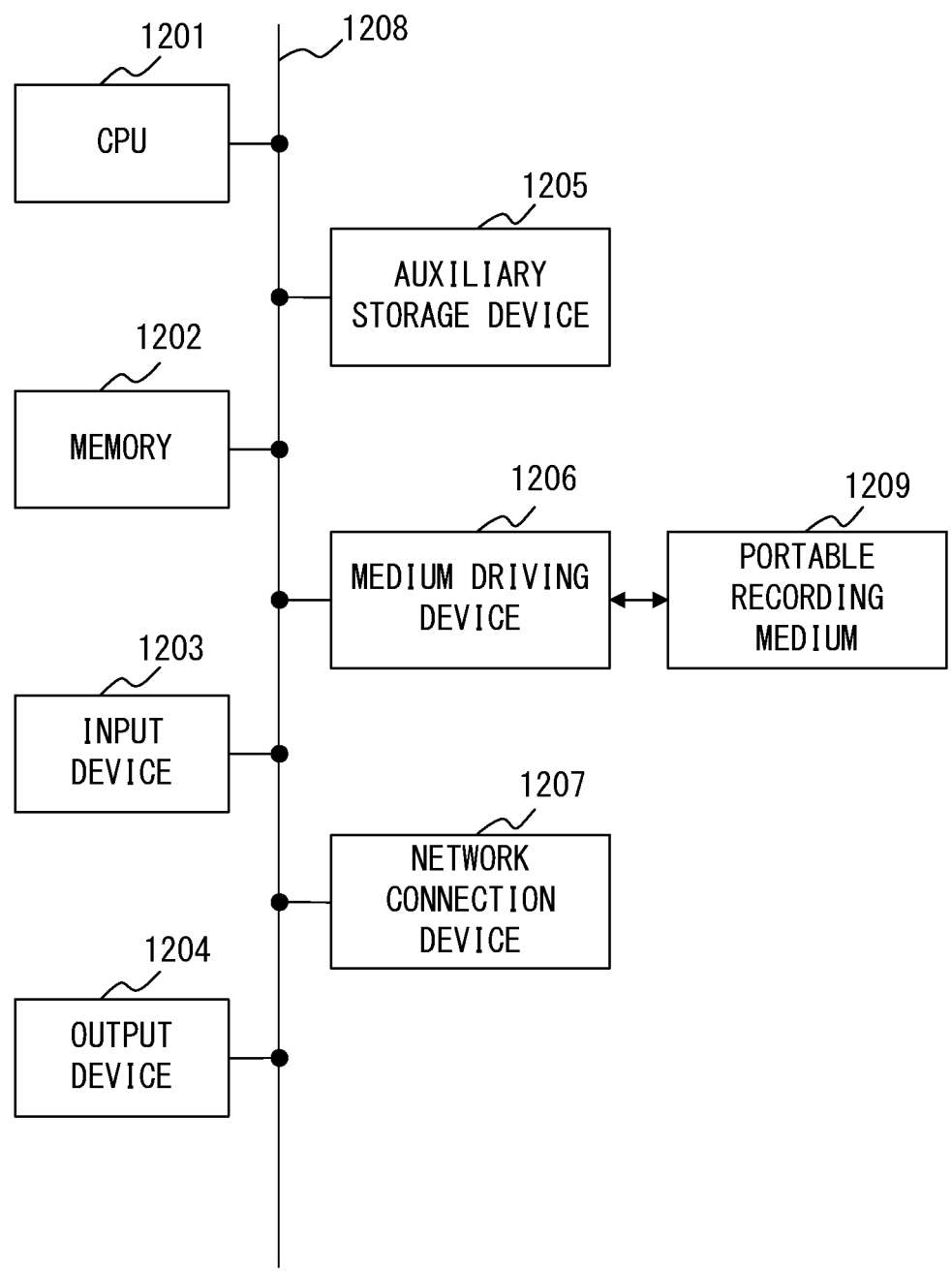
F I G. 1 2

BIOMETRIC AUTHENTICATION APPARATUS AND BIOMETRIC AUTHENTICATION METHOD

CROSS-REFERENCE TO RELATED APPLICATION

This application is based upon and claims the benefit of priority of the prior Japanese Patent Application No. 2018-239884, filed on Dec. 21, 2018, the entire contents of which are incorporated herein by reference.

FIELD

The embodiments discussed herein are related to a biometric authentication apparatus and a biometric authentication method.

BACKGROUND

Biometric authentication is a technology for identifying an individual using biometric features such as fingerprints, palm prints, veins, face, and so on. In biometric authentication, biometric features obtained from the person to be authenticated and biometric features registered in advance in a registration template are compared, and authentication for the person to be authenticated is performed according to the comparison result that indicates whether or not these biometric features match.

Biometric authentication may be used as a means for ensuring security when accessing important data in a mobile terminal device, or when accessing important data in a server from a mobile terminal device via a communication network. In addition, improved portability of mobile terminal devices has resulted in increased usage of mobile terminal devices in various situations including outdoors, calling for improved convenience with regard to their security functions.

In relation to biometric authentication, fingerprint authentication devices that perform personal authentication using a partial fingerprint image, terminal devices in which partial authentication is applied to vein authentication, and a biometric authentication technique using a guide that guides user's hand or finger (for example, see Patent Document 1 through Patent Document 4) are known. Blood vessel image input devices that detect the amount of scanning on a finger and join together a plurality of partial blood vessel images are also known (for example, see Patent Document 5).

In addition, techniques are also known for obtaining the three-dimensional shape of an object from a pattern projected on the object using light (for example, see Patent Document 6 through Patent Document 8).

Patent Document 1: Japanese Laid-open Patent Publication No. 2002-24831
Patent Document 2: Japanese Laid-open Patent Publication No. 2016-173669
Patent Document 3: Japanese Laid-open Patent Publication No. 2017-97574
Patent Document 4: Japanese Laid-open Patent Publication No. 2016-212636
Patent Document 5: Japanese Laid-open Patent Publication No. 2006-218019
Patent Document 6: U.S. Unexamined Patent Application Publication No. 2010/0118123
Patent Document 7: U.S. Pat. No. 9,952,036
Patent Document 8: Japanese National Publication of International Patent Application No. 2000-512012

SUMMARY

According to an aspect of the embodiments, a biometric authentication apparatus includes a biometric sensor, a shape sensor, a memory, and a processor coupled to the memory. The biometric sensor obtains a plurality of living body images along an authentication-target living body, and the shape sensor obtains, along the authentication-target living body, shape information corresponding to each of the plurality of living body images. The processor determines a position of apart of the authentication-target living body captured in each of the plurality of living body images, according to the shape information corresponding to the plurality of living body images. Then, the processor compares the biometric feature of each of the plurality of living body images and a registered biometric feature by using a determined position of the part of the authentication-target living body and performs authentication for the authentication-target living body according to a comparison result of comparing the biometric feature of each of the plurality of living body images and the registered biometric feature.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional configuration diagram of a biometric authentication apparatus;
FIG. 2 is a flowchart of a biometric authentication process;
FIG. 12 is a hardware configuration diagram of an information processing apparatus.

DESCRIPTION OF EMBODIMENTS

Figure 3:
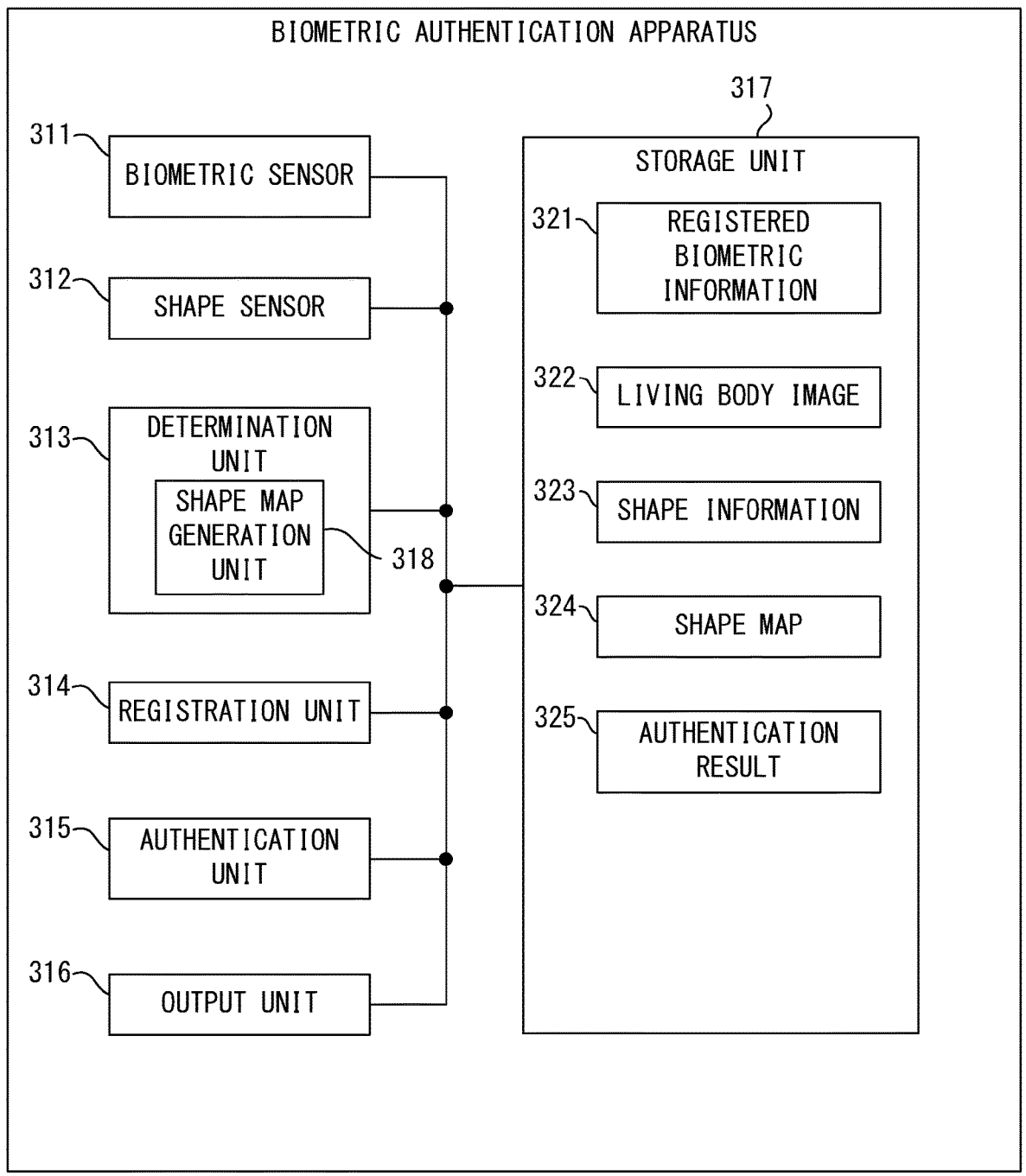
FIG. 3 is a functional configuration diagram illustrating a first specific example of a biometric authentication apparatus.

Hereinafter, embodiments are explained in detail with reference to the drawings.

For example, an advantage of vein authentication in which identification of an individual is performed by reading the vein pattern on the palm is that a high degree of security can be ensured, and that it can be easily used while the palm is in the still state.

However, it is very difficult to realize wide angle photography with a vein sensor of a size that is mountable on a small mobile terminal device. For this reason, when performing vein authentication by a mobile terminal device such as a smartphone equipped with a biometric authentication function, it is desirable that the palm is photographed at a position at a certain distance from the mobile terminal device to read the vein pattern of the whole palm.

At this time, as the distance between the mobile terminal device and the hand becomes larger, the positional relationship between the vein sensor and the hand becomes unstable, making it difficult to perform stable vein authentication. Meanwhile, it is possible to stabilize the positional relationship between the vein sensor and the hand by photographing the hand in a state in which the hand is holding the mobile terminal device. However, when bringing the hand close to the mobile terminal device, only a part of the palm is photographed, and also, the position of the hand holding the mobile terminal device is not always the same. Then, a method may be considered in which the vein pattern of the whole palm is registered at the time of registration, and at the time of authentication, only a part of the palm is photographed, and partial authentication is performed by comparing the whole vein pattern and the vein image of the part.

As described in Patent Document 1, partial authentication may be performed in fingerprint authentication. In partial authentication in fingerprint authentication, comparison can be performed by determining the position of the photographed fingerprint part using the center of a whorl of the fingerprint as a clue. For this reason, it is possible to determine the area of the registration template corresponding to the fingerprint part easily and to perform comparison at a high speed and with a high accuracy.

On the other hand, in vein authentication, a vein pattern does not include information such as the whorl that are used as a clue for the position. Therefore, a method may be considered in which the position of the vein pattern is determined using position information such as the contour of the finger or palm and comparison is performed. However, in partial authentication, the contour is not captured in the vein image, and it is difficult to immediately determine the corresponding area of the registration template.

In this case, comparison can be performed by scanning the vein pattern of the whole palm and by searching for a position that corresponds to the partial pattern captured in the vein image, but it increases the processing time for scanning the whole vein pattern. In addition, the partial pattern captured in the vein image may correspond to the partial pattern of another position included in the registration template of another user by chance, raising concerns for the risk of identifying a different person as a registered individual.

Therefore, as described in Patent Document 2 through Patent Document 4, a technique in which biometric information of the palm is scanned by a biometric sensor mounted on a mobile terminal device has been invented by the inventor and others. According to this technique, the relative positional relationship between the mobile terminal device and the hand may be fixed and the influence of hand shaking may be reduced by reading biometric information of the palm simultaneously as the hand operates the touch panel.

For example, with the terminal device in Patent Document 2, the biometric sensor photographs the vein pattern of the palm simultaneously when the user continuously slides a finger on the touch panel. Then, the authentication accuracy may be improved by associating the coordinate values of the input operation positions touched by the finger and the photographed area.

However, it is difficult to apply a method that uses an input device such as a touch panel or the like that is able to detect the position of the fingertip to a mobile terminal device that is not equipped with such an input device. In addition, the total amount of biometric information to be input is proportional to the amount of movement of the finger on the touch panel, and therefore, with a mobile terminal device such as a small tablet, a smartphone and the like that has a small touch panel, the amount of biometric information that can be obtained may not be enough, which may cause a decrease in the authentication accuracy.

Meanwhile, this problem occurs not only in the case of performing biometric authentication using the vein pattern but also in the case of performing biometric authentication using other living body images.

FIG. 1 illustrates an example of the functional configuration of a biometric authentication apparatus according to an embodiment. A biometric authentication apparatus 101 in FIG. 1 includes a living body image obtaining unit 111, a shape information obtaining unit 112, a determination unit 113, and an authentication unit 114.

FIG. 2 is a flowchart presenting an example of a biometric authentication process performed by the biometric authentication apparatus 101 in FIG. 1. First, the living body image obtaining unit 111 obtains a plurality of living body images along an authentication-target living body, and the shape information obtaining unit 112 obtains, along the authentication-target living body, shape information corresponding to each of the plurality of the living body images (Step 201).

Next, the determination unit 113 determines a position of a part of the authentication-target living body captured in each of the plurality of living body images, according to the shape information corresponding to each of the plurality of living body images (Step 202). Then, using the determined position, the authentication unit 114 compares the biometric feature of each of the plurality of living body images and a registered biometric feature, to perform authentication for the authentication-target living body according to the comparison result (Step 204).

According to the biometric authentication apparatus 101 in FIG. 1, the authentication accuracy in biometric authentication according to a plurality of living body images obtained along a living body may be improved.

FIG. 3 illustrates a first specific example of the biometric authentication apparatus 101 in FIG. 1. The biometric authentication apparatus 301 in FIG. 3 is, for example, a mobile terminal device such as a tablet, a smartphone, or the like and includes a biometric sensor 311, a shape sensor 312, a determination unit 313, a registration unit 314, an authentication unit 315, an output unit 316, and a storage unit 317. The determination unit 313 includes a shape map generation unit 318. The storage unit 317 stores registered biometric information 321.

The biometric sensor 311, the shape sensor 312, the determination unit 313, and the authentication unit 315 correspond to the living body image obtaining unit 111, the shape information obtaining unit 112, the determination unit 113, and the authentication unit 114 in FIG. 1, respectively.

The biometric sensor 311 is, for example, a vein sensor, a fingerprint sensor, an image sensor (camera) or the like, which photographs a living body such as the palm, the finger, the face and the like to obtain a living body image such as a vein image, a fingerprint image, a palm print image, a face image, and the like. In the case in which the biometric sensor 311 is a vein sensor, the biometric sensor 311 irradiate the palm with near infrared radiation or the like to photograph blood vessels or the like inside the hand.

For example, the living body image may be a grayscale image. When the size in the horizontal direction (p coordinate) of the living body image is H pixels and the size in the vertical direction (q coordinate) is V pixels, the grayscale living body image includes H×V luminance values I (p,q) (p=1 to H, q=1 to V).

The shape sensor 312 is, for example, a distance sensor of the structured-light system or the TOF (Time of Flight) system, which obtains shape information that represents the three-dimensional shape of the living body from a distance image that represents the distance from the shape sensor 312 to the living body.

A distance sensor of the structured-light system obtains shape information of a living body by casting a pattern such as a dot pattern, a line pattern, a grid pattern, or the like on an object by irradiation with light and reading the cast pattern. As a distance sensor of the structured-light system, for example, an optical sensor described in Patent Document 6 through Patent Document 8 may be used.

For example, the shape information may be a set of coordinate values that represents points in the three-dimensional space (xyz space). The shape information that represents n points includes the coordinate values $(x_i, y_i, z_i)$ (i=1 to n) of these points.

The determination unit 313 makes the biometric sensor 311 obtain the living body image and makes the shape sensor 312 obtain the shape information by controlling the biometric sensor 311 and the shape sensor 312. The biometric sensor 311 stores the obtained living body image in the storage unit 317, and the shape sensor 312 stores the obtained shape information in the storage unit 317. Then, the determination unit 313 obtains the living body image and the shape information by reading the living body image and the shape information from the storage unit 317.

Figure 4A:
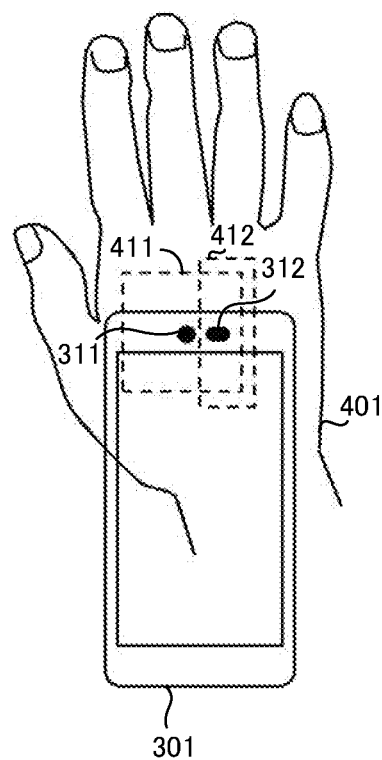
FIG. 4A is a drawing illustrating the positional relationship of a biometric sensor, a shape sensor, and a living body observed from the back side of a hand.
Figure 4B:
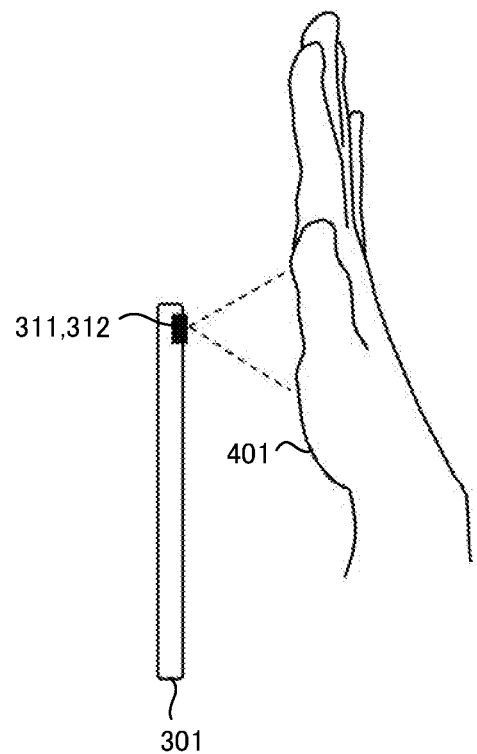
FIG. 4B is a drawing illustrating the positional relationship of a biometric sensor, a shape sensor, and a living body observed from the lateral side.

FIG. 4A and FIG. 4B illustrate examples of the positional relationship between the biometric sensor 311, the shape sensor 312 in FIG. 3 and the living body. In this case, the living body is a hand 401 of the user, and the biometric authentication apparatus 301 is a tablet or a smartphone.

FIG. 4A is a top view observing the state in which the hand 401 is put at a position away from the biometric authentication apparatus 301 by a prescribed distance, from the side of the back of the hand 401, and FIG. 4B is a side view observing the state from the lateral side. FIG. 4A also indicates with a solid line a part of the biometric authentication apparatus 301 that is not visible being hidden behind the hand 401

The biometric sensor 311 and the shape sensor 312 are placed at positions on the surface of the biometric authentication apparatus 301 such that they may observe the hand 401 at the same time. A sensing area 411 of the living body image by the biometric sensor 311 and a sensing area 412 of the shape information by the shape sensor 312 are known.

Figure 5:
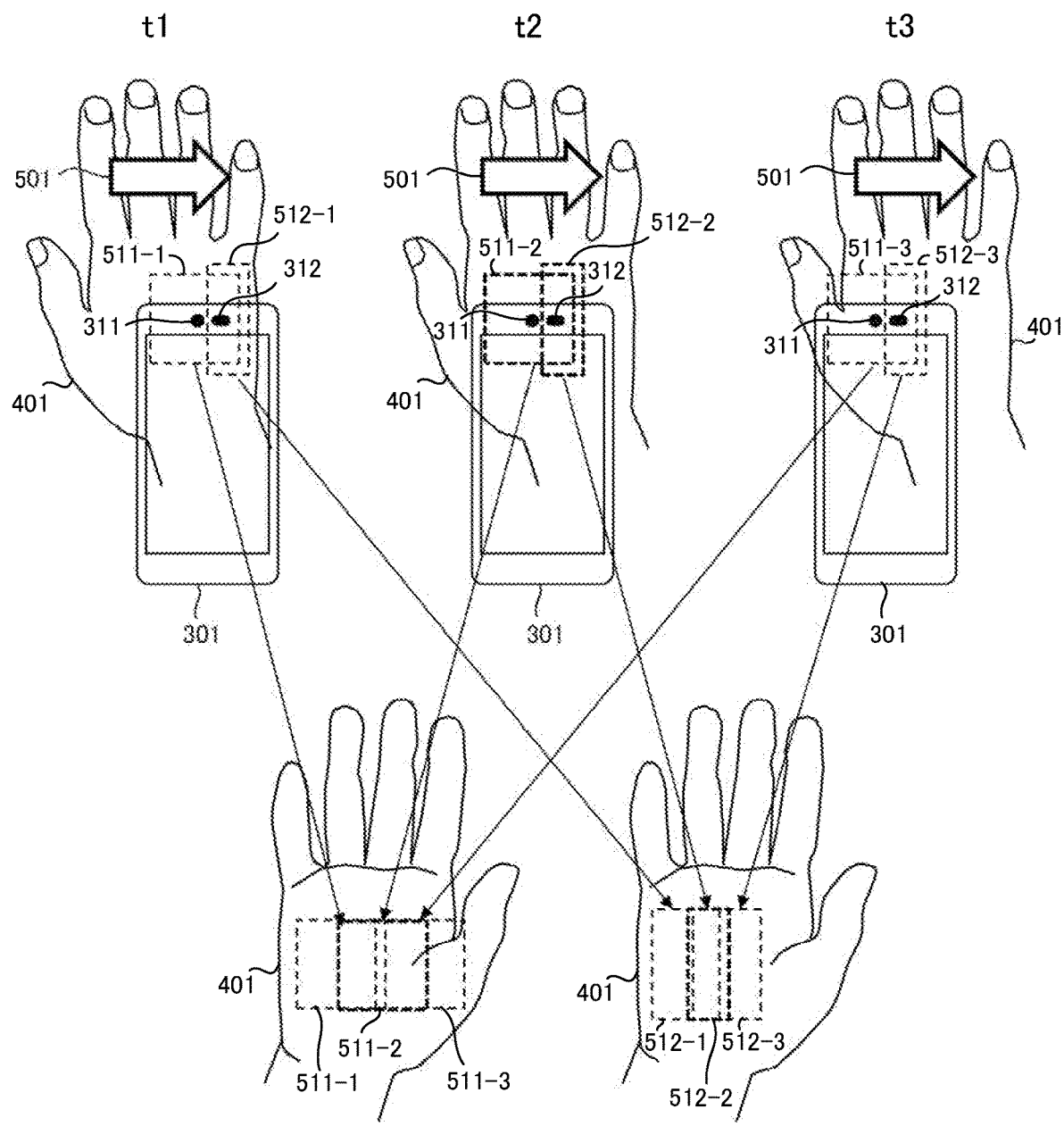
FIG. 5 is a drawing illustrating scans for obtaining a living body image of a hand.

FIG. 5 illustrates an example of scanning for obtaining the living body image of the hand 401 by the biometric authentication apparatus 301 in FIG. 4A and FIG. 4B. The user relatively changes the position of the hand 401 with respect to the biometric sensor 311 in a state in which the distance from the biometric sensor 311 to the hand 401 changes as little as possible. For example, the user moves the hand 401 put above the biometric authentication apparatus 301 in the direction of an arrow 501. With the biometric sensor 311 obtaining the living body images during the movement of the hand 401, a plurality of living body images may be obtained continuously along the hand 401. In addition, with the shape sensor 312 obtaining the distance during the movement of the hand 401, a plurality of pieces of shape information may be obtained continuously along the hand 401. At this time, the biometric sensor 311 and the shape sensor 312 obtain the living body images and the shape information in a synchronized manner.

At a time t1, the living body image of a partial area 511-1 and the shape information of a partial area 512-1 are obtained. At a time t2, the living body image of a partial area 511-2 and the shape information of a partial area 512-2 are obtained. Further, At a time t3, the living body image of a partial area 511-3 and the shape information of a partial area 512-3 are obtained.

For example, in the case in which the wavelengths of the irradiation light of the biometric sensor 311 and that of the shape sensor 312 are the same, the irradiation light of the shape sensor 312 may be detected as a noise when the biometric sensor 311 obtains the living body image. In this case, the influence of the irradiation light of the shape sensor 312 may be suppressed by shifting the timing to obtain the living body image and the timing to obtain the shape information by a prescribed time.

Meanwhile, in a case in which the living body image and the shape information are obtained simultaneously, it is desirable to use, as the irradiation light of the shape sensor 312, irradiation light having a wavelength that is different from the wavelength of the irradiation light of the biometric sensor 311. In this case, the influence of the irradiation light used by the other sensor may be suppressed by mounting, in an image capturing unit of each of the biometric sensor 311 and the shape sensor 312, a wavelength filter that passes only the light of the wavelength used by each sensor.

The shape map generation unit 318 generates a shape map that is wide-area shape information, from the plurality of pieces of shape information obtained by the shape sensor 312. The shape map generation unit 318 generates the shape map, for example, by joining together the shape information of a plurality of partial areas obtained continuously. Accordingly, the relative position of each piece of shape information with respect to the wide-area three-dimensional shape of the living body is determined, making it possible to determine the positional relationship between the pieces of shape information.

In order to join together the shape information of two continuous partial areas, it is desirable that these partial areas include overlapping areas that overlap with each other. For this reason, the shape sensor 312 obtains the shape information at a sampling rate that is sufficiently fast with respect to the moving speed of the hand 401, and the biometric sensor 311 also obtains the living body images at the same sampling rate as that of the shape sensor 312. For example, the sampling rate may be 15 to 30 frames per second.

When a gap is generated between two partial areas, no overlapping parts exist between the partial areas, and therefore, the generation of the shape map may fail. In this case, the biometric authentication apparatus 301 instructs the user to make the movement speed of the hand 401 slower and try the reading again, and the biometric sensor 311 and the shape sensor 312 obtain the living body images and the shape information again.

Next, the determination unit 313 determines, regarding the part of the living body captured in each living body image obtained by the biometric sensor 311, the relative position of the part with respect to the shape map. The determination unit 313 may, for example, determine the relative position of each of the shape information with respect to the shape map, and may adopt the determined relative position as the relative position of the part of the living body captured in the living body image captured in synchronization with the shape information. In this case, since the positional relationship of the living body image is determined from the positional relationship of the shape information, the sensing area 412 of the shape information and the sensing area 411 of the living body images do not have to match.

The registered biometric information 321 corresponds to the registration template and includes a registered biometric feature that is extracted from each of the plurality of living body images of the registration-target living body, the position of the part of the registration-target living body captured in each of the living body image, and the shape map of the registration-target living body. The registered biometric feature extracted from each living body image and the position of the part of the registration-target living body captured in the living body image are associated with each other.

At the time of the registration of the registered biometric information 321, the biometric sensor 311 obtains a plurality of living body images along the registration-target living body, and the shape sensor 312 obtains shape information corresponding to each of the plurality of living body images, along the registration-target living body. The shape map generation unit 318 generates the shape map of the registration-target living body from the plurality of pieces of shape information, and the determination unit 313 determines, regarding a part of the registration-target living body captured in each living body image, the position of the part in the shape map.

The registration unit 314 generates the registered biometric information 321 that includes the biometric feature extracted from each living body image, the position of the part of the registration-target living body captured in each living body image, and the shape map of the registration-target living body. Then, the registration unit 314 registers the registered biometric information 321 in the storage unit 317.

At the time of the authentication of the authentication-target living body, the biometric sensor 311 obtains a plurality of living body images 322 along the authentication-target living body and stores them in the storage unit 317. The shape sensor 312 obtains shape information 323 corresponding to each of the plurality of living body images 322 along the authentication-target living body and store it in the storage unit 317. The shape map generation unit 318 generates a shape map 324 of the authentication-target living body from the plurality of pieces of shape information 323 and stores it in the storage unit 317. The determination unit 313 determines, regarding a part of the authentication-target living body captured in each living body image, the position of the part in the shape map 324.

The authentication unit 315 performs alignment of the shape map 324 of the authentication-target living body and the shape map included in the registered biometric information 321. Then, the authentication unit 315 compares the biometric feature extracted from each of the plurality of living body images 322 and the biometric feature included in the registered biometric information 321, using the determined position of the part of the authentication-target living body and the position of the part of the registration-target living body included in the registered biometric information 321. Accordingly, it becomes possible to determine the position of the biometric feature in a short time, and also, the possibility of wrong comparison due to ambiguity of the position of the biometric feature is reduced.

Next, the authentication unit 315 performs authentication for the authentication-target living body according to the comparison result and stores an authentication result 325 that indicates authentication success or authentication failure in the storage unit 317. Authentication success represents that the authentication-target living body matches the registration-target living body, and authentication failure represents that the authentication-target living body and the registration-target living body do not match. The output unit 316 outputs the authentication result 325.

According to the biometric authentication apparatus 301 in FIG. 3, even a mobile terminal device that is not equipped with a touch panel is able to accurately determine the positional relationship between a plurality of living images obtained along a living body. Accordingly, it is possible to compare the biometric feature of the authentication-target living body and the registered biometric feature according to the correct positional relationship, and the authentication accuracy is improved.

In addition, the information amount of the living body images to be input does not depend on the movement amount by which the finger moves on the touch panel, and therefore, even a mobile terminal device with a touch panel having a small area is able to obtain sufficient biometric information, and a prescribed authentication accuracy is ensured.

Figure 6:
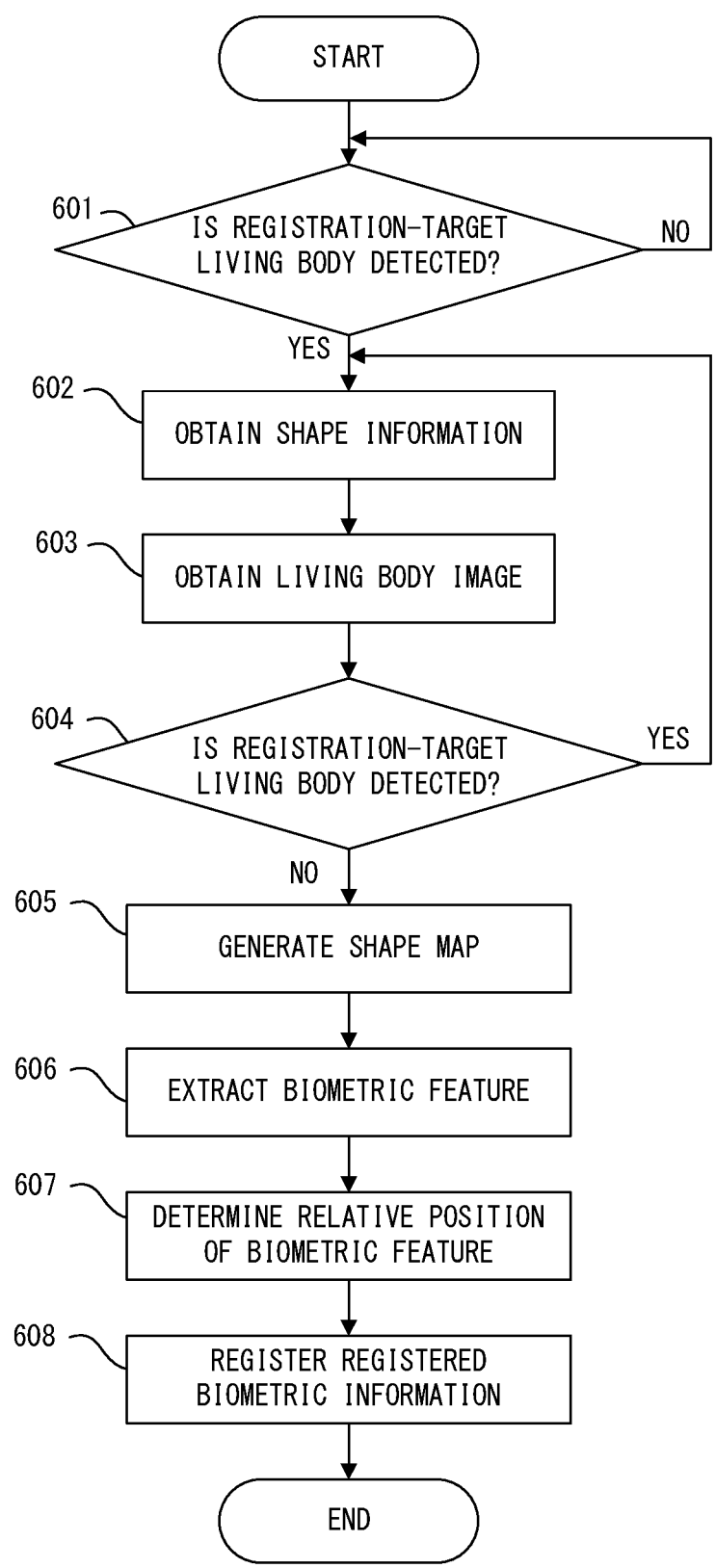
FIG. 6 is a flowchart of a registration process.

FIG. 6 is a flowchart illustrating an example of a registration process performed by the biometric authentication apparatus 301 in FIG. 3. First, the shape sensor 312 checks whether or not a registration-target living body is detected within the sensing area (Step 601), and when a registration-target living body is not detected (Step 601, NO), the process of Step 601 is repeated.

When a registration-target living body is detected (Step 601, YES), the shape sensor 312 obtains the shape information of the registration-target living body and stores it in the storage unit 317 (Step 602). In addition, the biometric sensor 311 obtains a living body image of the registration-target living body in synchronization with the shape sensor 312, associates the living body images with the shape information stored in Step 602 and stores them in the storage unit 317 (Step 603).

Next, the shape sensor 312 checks whether or not a registration-target living body is detected within the sensing area (Step 604), and when a registration-target living body is detected (Step 604, YES), the biometric authentication apparatus 301 repeats the processes in and after Step 602.

For example, in the case of the biometric authentication apparatus 301 illustrated in FIG. 4A and FIG. 4B, when apart of the hand 401 that is moving enters the sensing area 412, in Step 601, it is determined that a registration-target living body is detected. Then, when the hand 401 that is moving moves away from the sensing area 412, in step S604, it is determined that a registration-target living body is not detected.

When a registration-target living body is not detected (Step 604, NO), the shape map generation unit 318 generates a shape map of the registration-target living body from a plurality of pieces of shape information stored in the storage unit 317 (Step 605). Then, the determination unit 313 determines the relative position of each shape information with respect to the shape map.

Next, the determination unit 313 extracts, from each living body image stored in the storage unit 317, the biometric feature of the part of the registration-target living body captured in the living image (Step 606). For example, in the case in which the living body image is a vein image, a vein pattern is extracted as the biometric feature, and in the case in which the living body image is a fingerprint image, a fingerprint pattern is extracted as biometric information. In addition, in the case in which the living body image is a palm print image, a palm print pattern is extracted as the biometric feature, and in the case in which the living body image is a face image, the position and the size of each part of the face are extracted as the biometric feature.

Next, the determination unit 313 determines the relative position of each biometric feature with respect to the shape map, according to the correspondence relationship of the living body images and the shape information (Step 607). Then, the registration unit 314 generates the registered biometric information 321 that includes information in which each biometric feature and the relative position of the biometric feature are associated and the shape map of the registration-target living body and registers it in the storage unit 317 (Step 608).

Figure 7:
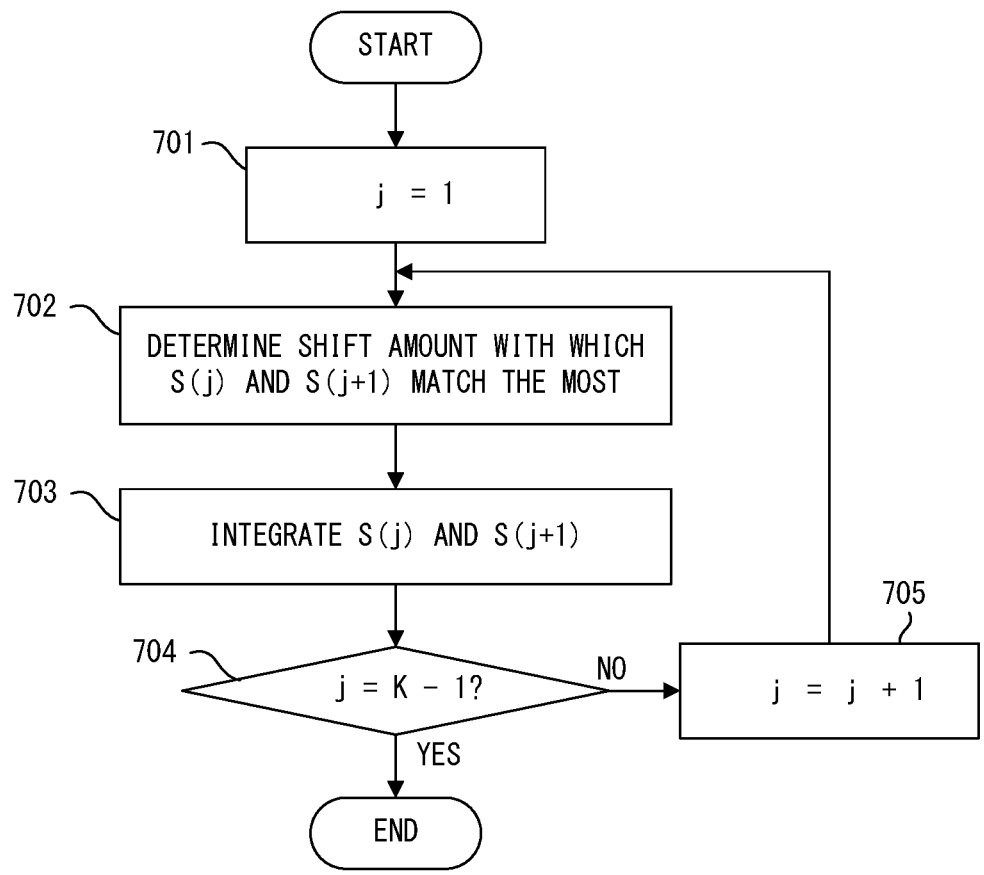
FIG. 7 is a flowchart of a shape map generation process.

FIG. 7 is a flowchart illustrating an example of the shape map generation process in Step 605 in FIG. 6. Shape information S(1) through shape information S(K) (K is an integer equal to or larger than 2) represents K pieces of shape information obtained continuously. The partial area of the shape information S(j) (j=1 to K−1) and the partial area of the shape information S(j+1) include overlapping parts that overlap with each other.

First, the shape map generation unit 318 sets a control variable j that represents the shape information S(j) to 1 (Step 701). Then, the shape map generation unit 318 determines a relative shift amount (dx,dy,dz) with which the overlapping part in the shape information S(j) and the overlapping part in the shape information S(j+1) match the most (Step 702).

Next, the shape map generation unit 318 integrates the shape information S(j) and the shape information S(j+1) by shifting the coordinate values of each point included in the shape information S(j+1) by (dx,dy,dz) (Step 703). Then, the shape map generation unit 318 compares j with K−1 (Step 704).

In the case in which j is smaller than K−1 (Step 704, NO), the shape map generation unit 318 increments j by 1 (Step 705) and repeats the processes in and after Step 702. Then, in the case in which j has reached K−1 (Step 704, YES), the shape map generation unit 318 terminates the process. The integrated shape information S(1) through shape information S(K) are used as the shape map.

Figure 8:
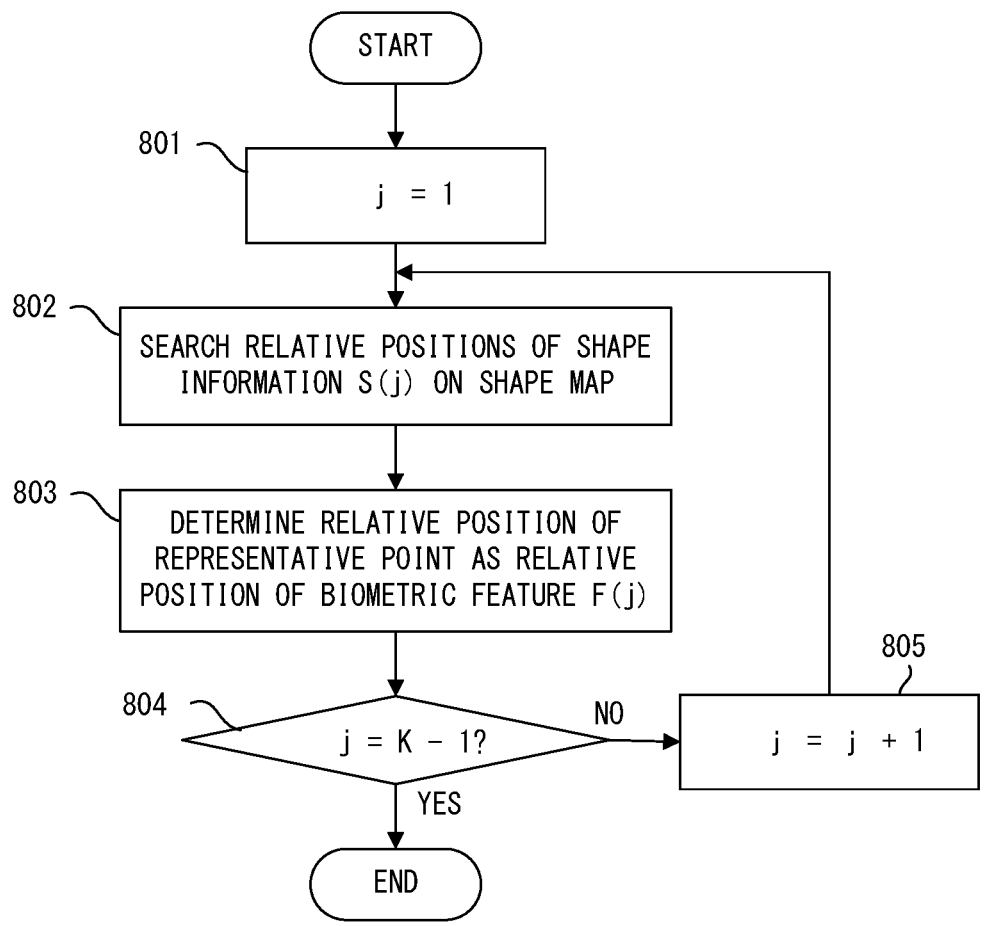
FIG. 8 is a flowchart of a position determination process.

FIG. 8 is a flowchart illustrating an example of the position decision process in Step 607 in FIG. 6. The biometric feature F(j) (j=1 to K−1) represents the biometric feature extracted from the living body image obtained in synchronization with the shape information S(j).

First, the determination unit 313 sets a control variable j that represents the biometric information F(j) to (Step 801). Next, the determination unit 313 searches the relative positions of the shape information S(j) on the shape map (Step 802) and determines the relative position of a representative point included in the shape information S(j) as the relative position of the biometric information F(j) (Step 803). As the representative point, for example, the point obtained first among the n points included in the shape information S(j) may be used. Then the determination unit 313 compares j with K−1 (Step 804).

In the case in which j is smaller than K−1 (Step 804, NO), the determination unit 313 increments j by 1 (Step 805) and repeats the processes in and after Step 802. Then, in the case in which j has reached K−1 (Step 804, YES), the determination unit 313 terminates the process.

For example, in a case in which the biometric sensor 311 and the shape sensor 312 obtain the living body image and the shape information simultaneously, the correspondence accuracy between the coordinates of a point in the living body image and the coordinates of a point in the shape information improve, and therefore, the relative position of the biometric feature may be determined with a good accuracy.

Figure 9:
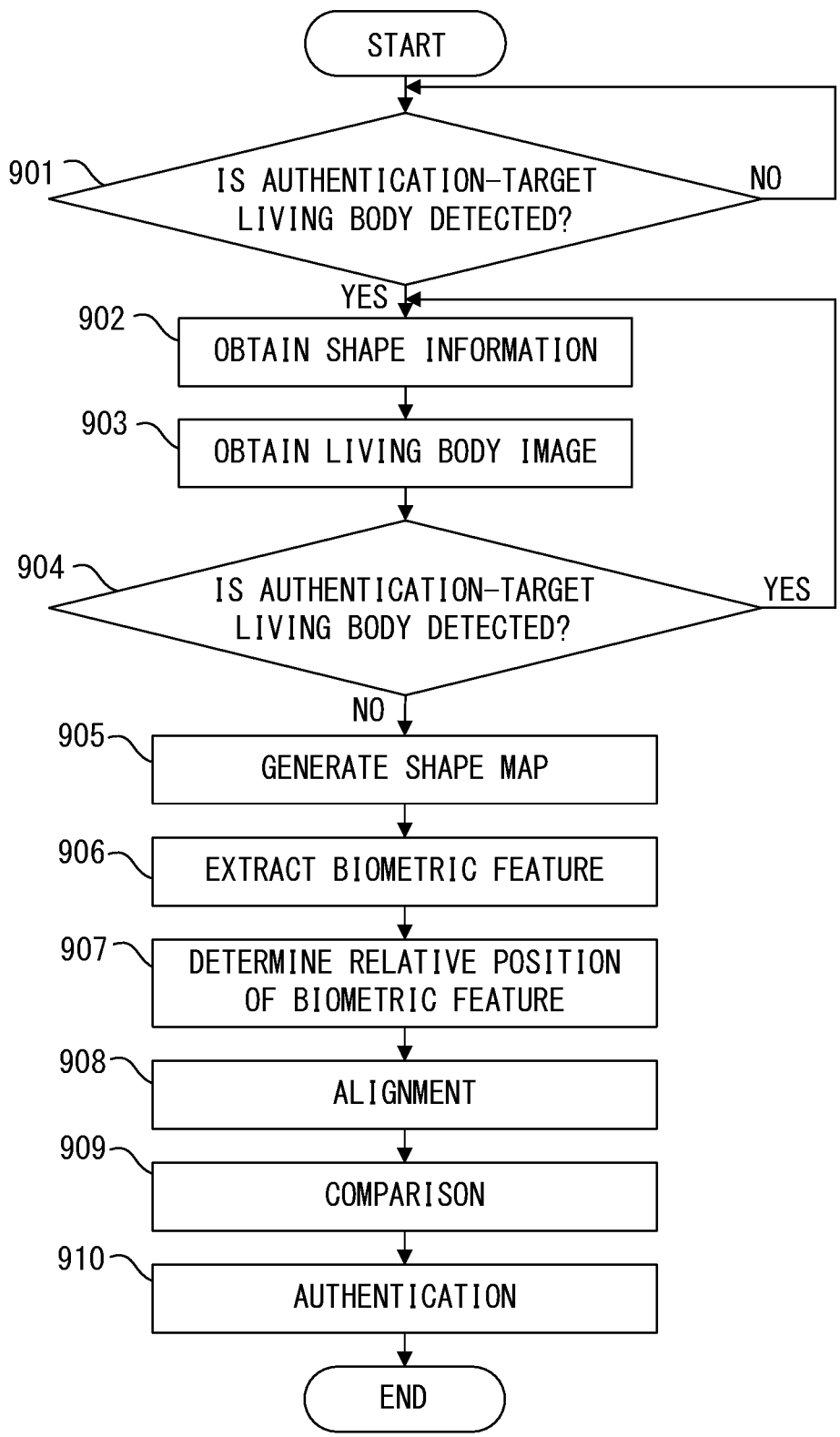
FIG. 9 is a flowchart of an authentication process.

FIG. 9 is a flowchart illustrating an example of the authentication process performed by the biometric authentication apparatus 301 in FIG. 3. First, the shape sensor 312 checks whether or not an authentication-target living body is detected within the sensing area (Step 901), and when an authentication-target living body is not detected (Step 901, NO), the process in Step 901 is repeated.

When an authentication-target living body is detected (Step 901, YES), the shape sensor 312 obtains the shape information 323 of the authentication-target living body and stores it in the storage unit 317 (Step 902). In addition, the biometric sensor 311 obtains the living body image 322 of the authentication-target living body in synchronization of the shape sensor 312, associates the living body image 322 with the shape information 323 obtained in Step 902 and stores it in the storage unit 317 (Step 903).

Next, the shape sensor 312 checks whether or not an authentication-target living body is detected within the sensing area (Step 904), and when an authentication-target living body is detected (Step 904, YES), the biometric authentication apparatus 301 repeats processes in and after Step 902.

When the authentication-target living body is not detected (Step 904, NO), the shape map generation unit 318 generates the shape map 324 of the authentication-target living body by the shape map generation process similar to that in FIG. 7, from the plurality of pieces of shape information 323 stored in the storage unit 317 (Step 905). Then, the determination unit 313 determines the relative position of each of the shape information 323 with respect to the shape map 324.

Next, the determination unit 313 extracts, from each living body image 322 stored in the storage unit 317, the biometric feature of the part of the authentication-target living body captured in the living body image 322 (Step 906). Then, the determination unit 313 determines the relative position of each biometric feature with respect to the shape map 324 by the position decision process that is similar to that in FIG. 8, according to the correspondence relationship between the living body image 322 and the shape information 323 (Step 907).

Next, the authentication unit 315 performs alignment of the shape map 324 and the shape map included in the registered biometric information 321 to unify the coordinate system of the position of the part of the authentication-target living body and the coordinate system of the position of the part of the registration-target living body included in the registered biometric information 321 (Step 908). Next, the authentication unit 315 identifies the relative position of the registered biometric feature that is closest to the relative position of the biometric feature extracted from each living body image 322, in the unified coordinate system. Then, the authentication unit 315 compares the biometric feature extracted from the living body image 322 and the registered biometric feature associated with the identified relative position (Step 909).

Next, the authentication unit 315 calculates the degree of similarity between the authentication-target living body and the registration-target living body using the comparison results for the biometric features extracted from all the living body images 322 and generates the authentication result 325 for the authentication-target living body by comparing the degree of similarity with a threshold (Step 910). For example, when the degree of similarity is larger than the threshold, the authentication result 325 that represents the authentication success is generated, and when the degree of similarity is equal to or smaller than the threshold, the authentication result 325 that represents the authentication failure is generated. Then, the output unit 316 outputs the authentication result 325.

Figure 10:
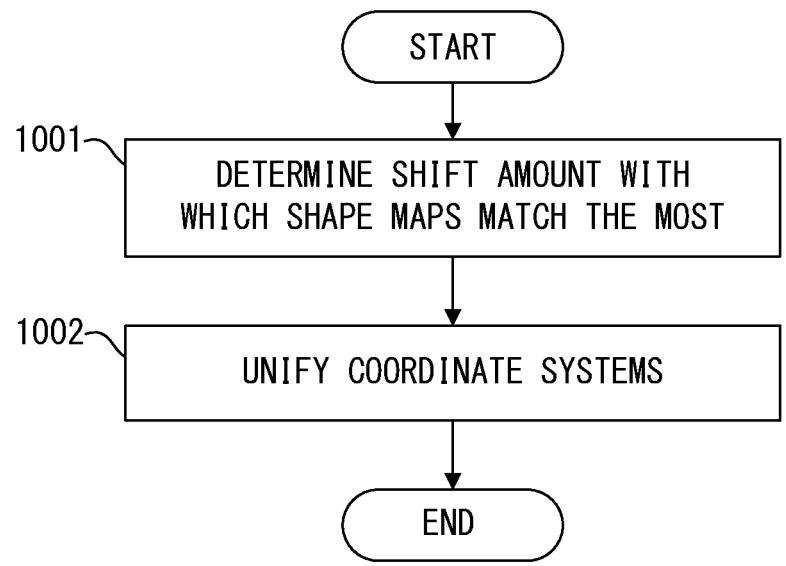
FIG. 10 is a flowchart of an alignment process.

FIG. 10 is a flowchart illustrating an example of the alignment process in Step 908 in FIG. 9. First, the authentication unit 315 determines a relative shift amount ($\Delta x, \Delta y, \Delta z$) with which the shape map 324 and the shape map included in the registered biometric information 321 match the most (Step 1001).

Next, the authentication unit 315 makes the coordinate system of the shape map 324 match the coordinate system of the shape map included in the registered biometric information 321 by shifting the coordinate values of each point included in the shape map 324 by ($\Delta x, \Delta y, \Delta z$) (Step 1002).

According to the registration process in FIG. 6 and the authentication process in FIG. 9, by performing alignment of the shape map of the authentication-target living body and the shape map of the registration-target living body, the biometric feature of the authentication-target living body and the registered biometric feature may be compared in a unified coordinate system. Therefore, the accuracy of the comparison result is improved, and the accuracy of the authentication result is also improved.

Figure 11:
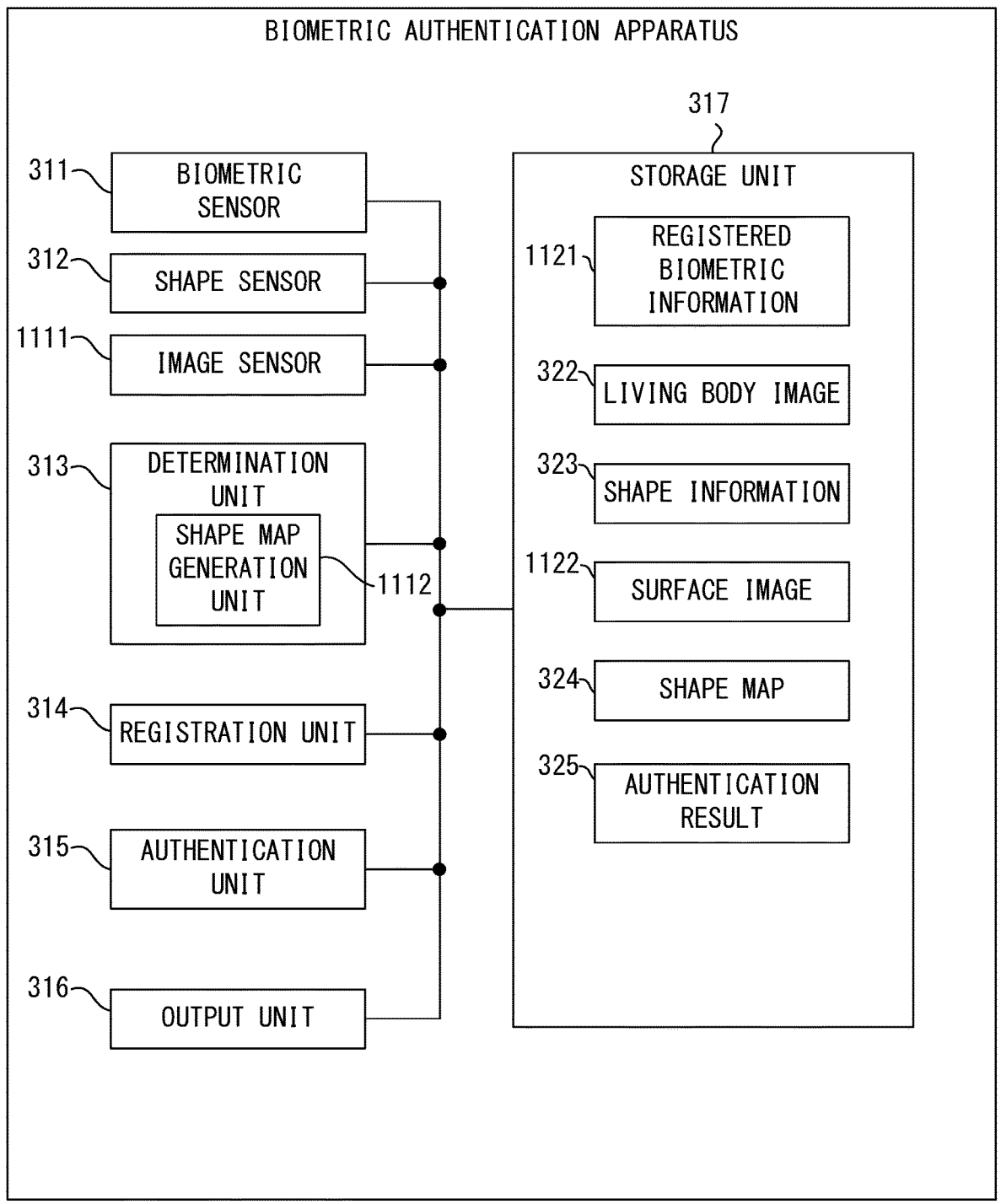
FIG. 11 is a functional configuration diagram illustrating a second specific example of a biometric authentication apparatus.

FIG. 11 illustrates a second specific example of the biometric authentication apparatus 101 in FIG. 1. A biometric authentication apparatus 1101 in FIG. 11 has a configuration in which an image sensor 1111 is added and the shape map generation unit 318 is replaced with a shape map generation unit 1112 in the biometric authentication apparatus 301 in FIG. 3. The shape map generation unit 1112 generates the shape map using, in addition to the shape information of the living body, surface information of the living body such as the color, the pattern, and the like.

The image sensor 1111 photographs the surface of the living body and obtains a surface image. For example, the surface image may be an RGB-format color image, a YUV-format color image, or the like. In a case in which the size of the living body image in the horizontal direction (p coordinate) is H pixels and the size in the vertical direction (q coordinate) is V pixels, the RGB-format surface image includes color information composed of R pixel value R(p,q), G pixel value G(p,q) and B pixel value B(p,q) (p=1 to H, q=1 to V).

The biometric sensor 311, the shape sensor 312, and the image sensor 1111 obtain the living body image, the shape information, and the surface image in synchronization.

The registered biometric information 1121 includes registered biometric feature that is extracted from each of the plurality of living body images of the registration-target living body, the position of the part of the registration-target living body captured in each of the living body images, a plurality of surface images of the registration-target living body, and the shape map of the registration-target living body. The registered biometric feature extracted from each living body image, the position of the part of the registration-target living body captured in the living body image, and the surface image captured in synchronization with the living body image are associated with each other.

When registering the registered biometric information 1121, the biometric sensor 311 obtains a plurality of living body images along the registration-target living body, and the shape sensor 312 obtains the shape information corresponding to each of the plurality of living images along the registration-target living body. The image sensor 1111 obtains a surface image corresponding to each of the plurality of living body images along the surface of the registration-target living body. The shape map generation unit 1112 generates the shape map of the registration-target living body from the plurality of pieces of shape information and the plurality of surface images.

In this case, the shape map generation unit 1112 is able to determine the relative shift amount (dx,dy,dz) between the shape information S(j) and the shape information S(j+1), according to the following procedure for example, in Step 702 in FIG. 7.

(P1) The shape map generation unit 1112 determines a coordinate conversion parameter C1 for converting a point on a distance image captured by the shape sensor 312 when obtaining the shape information S(j) to a point in a three-dimensional space by using the distance image.

(P2) The shape map generation unit 1112 determines a coordinate conversion parameter C3 for converting a point on a surface image to a point in the three-dimensional space by using the coordinate conversion parameter C1 and a known coordinate conversion parameter C2 for converting a point on the surface image to a point on the distance image.

(P3) The shape map generation unit 1112 determines a relative shift amount (dp,dq) on a surface image with which the pixel values of the surface image obtained in synchronization with the shape information S(j) and the pixel values of the surface image obtained in synchronization with the shape information S(j+1) match the most. Accordingly, a shift amount (dp,dq) with which the surface information such as the color, pattern, and the like match the most between the two surface images is obtained.

(P4) The shape map generation unit 1112 converts the shift amount (dp,dq) to the shift amount (dx,dy,dz) using the coordinate conversion parameter C3.

The determination unit 313 determines, regarding the part of the registration-target living body captured in each living body image, the position of the part in the generated shape map. The registration unit 314 generates the registered biometric information 1121 that includes the biometric feature extracted from each living body image, the position of the part of the registration-target living body captured in each living body image, each surface image, and the shape map of the registration-target living body. Then, the registration unit 314 registers the registered biometric information 1121 in the storage unit 317.

When authenticating the authentication-target living body, the biometric sensor 311 obtains a plurality of living body images 322 along the authentication-target living body and stores them in the storage unit 317. The shape sensor 312 obtains the shape information 323 corresponding to each of the plurality of living body images 322 and stores it in the storage unit 317. The image sensor 1111 obtains the surface image 1122 corresponding to each of the plurality of living body images 322 along the surface of the authentication-target living body and stores them in the storage unit 317.

The shape map generation unit 1112 generates the shape map 324 of the authentication-target living body from the plurality of pieces of shape information 323 and the plurality of surface images 1122 using the procedure (P1) through the procedure (P4) and stores it in the storage unit 317. The determination unit 313 determines, regarding the part of the authentication-target living body captured in each living body, the position of the part in the shape map 324.

The authentication unit 315 performs alignment of the shape map 324 of the authentication-target living body and the shape map included in the registered biometric information 1121. Then, the authentication unit 315 compares the biometric feature extracted from each of the plurality of living body images 322 and the biometric feature included in the registered biometric information 1121 using the determined position of the part of the authentication-target living body and the portion of the part of the registration-target living body included in the registered biometric information 1121.

Next, the authentication unit 315 performs authentication for the authentication-target living body according to the comparison results and stores the authentication result 325 in the storage unit 317. The output unit 316 outputs the authentication result 325.

According to the biometric authentication apparatus 1101 in FIG. 11, by generating the shape map using surface information such as the color, the pattern, and the like of the living body, it becomes possible to generate a shape map having a higher accuracy.

Meanwhile, in the case in which the biometric sensor 311 is an image sensor, the shape map generation unit 1112 may generate the shape map using a surface image captured by the biometric sensor 311. In this case, the image sensor 1111 may be omitted.

The configurations of the biometric authentication apparatus in FIG. 1, FIG. 3, and FIG. 11 are merely an example, and a part of the constituent elements may be omitted or changed according to the purpose or the conditions of the biometric authentication apparatus. For example, in the biometric authentication apparatuses in FIG. 3 and FIG. 11, when the registered biometric information is registered in advance in the storage unit 317, the registration unit 314 may be omitted. The biometric authentication apparatus does not have to be limited to a mobile terminal device and it may be a stationary information processing apparatus that performs logon management, room entrance and exit control, and the like.

The flowcharts in FIG. 2 and FIG. 6 through FIG. 10 are merely an example, and a part of the processes may be omitted or changed according to the configuration or the conditions of the biometric authentication apparatus. For example, when the registered biometric information is registered in advance in the storage unit 317, the registration process of FIG. 6 may be omitted.

The positional relationship of the biometric sensor 311, the shape sensor 312, and the hand 401 in FIG. 4A and FIG. 4B is merely an example, and the biometric sensor 311 and the shape sensor 312 may be placed at a different position on the biometric authentication apparatus 301. The sensing area 411 and the sensing area 412 are merely an example, and these sensing areas change according to the specification of the biometric sensor 311 and the shape sensor 312.

The partial area 511-1 through the partial area 511-3 and the partial area 512-1 through the partial area 512-3 in FIG. 5 are merely an example, and the partial areas to be photographed change according to the sensing area of the biometric sensor 311 and the shape sensor 312.

FIG. 12 illustrates a hardware configuration example of an information processing apparatus (computer) used as the biometric authentication apparatus 101 in FIG. 1, the biometric authentication apparatus 301 in FIG. 3, and the biometric authentication apparatus 1101 in FIG. 11. The information processing apparatus in FIG. 12 includes a central processing unit (CPU) 1201, a memory 1202, an input device 1203, an output device 1204, an auxiliary storage device 1205, a medium driving device 1206, and a network connection device 1207. These constituent elements are hardware and are connected to each other by a bus 1208. The biometric sensor 311 and the shape sensor 312 in FIG. 3 and FIG. 11 and the image sensor 1111 in FIG. 11 may be connected to the bus 1208.

The memory 1202 is a semiconductor memory such as a Read Only Memory (ROM), a Random Access Memory (RAM), a flash memory, or the like and stores programs and data used for the processing. The memory 1202 may be used as the storage unit 317 in FIG. 3 and FIG. 11.

The CPU 1201 (processor) operates as the determination unit 113 and the authentication unit 114 in FIG. 1, for example, by excusing a program using the memory 1202. The CPU 1201 also operates as the determination unit 313, the registration unit 314, and the authentication unit 315 in FIG. 3 and FIG. 11 by executing a program using the memory 1202. The CPU 1201 also operates as the shape map generation unit 318 in FIG. 3 and the shape map generation unit 1112 in FIG. 11 by executing a program using the memory 1202.

The input device 1203 is, for example, a keyboard, a pointing device, and the like and is used for the input of an instruction or information from the operator or the user. The output device 1204 is, for example, a display device, a printer, a speaker and the like and is used for the output of an enquiry to the operator or the user, or the processing result. The output device 1204 may be used as the output unit 316 in FIG. 3 or FIG. 11. The processing result may be the authentication result 325.

The auxiliary storage device 1205 is, for example, a magnetic disk device, an optical disk device, a magneto-optic disk device, a tape device, and the like. The auxiliary storage device 1205 may also be a flash memory or a hard disk drive. In the case in which the information processing apparatus is a mobile terminal device, a flash memory may be used as the auxiliary storage device 1205. The information processing apparatus may store programs and data in the auxiliary storage device 1205 and may load them onto the memory 1202 and use them. The auxiliary storage device 1205 may be used as the storage unit 317 in FIG. 3 and FIG. 11.

The medium driving device 1206 drives a portable recording medium 1209 and accesses its recorded content. The portable recording medium 1209 is a memory device, a flexible disk, an optical disk, a magneto-optical disk, and the like. The portable recording medium 1209 may also be a Compact Disk Read Only Memory (CD-ROM), a Digital Versatile Disk (DVD), a Universal Serial Bus (USB) memory, and the like. In the case in which the information processing apparatus is a mobile terminal device, a memory card may be used as the portable recording medium 1209. The operator or the user may store programs and data in the portable recording medium 1209 and may load them onto the memory 1202 and use them.

Thus, the computer-readable recording medium that stores programs and data used for the processing is a physical (non-transitory) recording medium such as the memory 1202, the auxiliary storage device 1205, or the portable recording medium 1209.

The network connection device 1207 is a communication interface circuit that is connected to a communication network such as the Local Area Network, Wide Area Network and the like and that performs data conversion involved in the communication. The information processing apparatus may receive programs and data from an external device via the network connection device 1207 and may load them onto the memory 1202 and use them.

Meanwhile, the information processing apparatus does not need to include all the constituent elements in FIG. 12, and a part of the constituent elements may be omitted according to the purpose or the conditions. For example, in a case in which the information processing apparatus does not use the portable recording medium 1209 or the communication network, the medium driving device 1206 or the network connection device 1207 may be omitted.

In the case in which the information processing apparatus is a mobile terminal device, the information processing apparatus may include devices for talking such as a microphone and a speaker.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric authentication apparatus comprising:
    a biometric sensor configured to obtain a plurality of living body images along an authentication-target living body by scanning the authentication-target living body while a position of the authentication-target living body relative to the biometric sensor is changing;
    a shape sensor configured to obtain, along the authentication-target living body, shape information corresponding to each of the plurality of living body images while the position of the authentication-target living body relative to the biometric sensor is changing;
    a memory;
    a processor coupled to the memory and the processor configured to
    determine a position of a part of the authentication-target living body captured in each of the plurality of living body images, according to the shape information corresponding to each of the plurality of living body images, and
    compare a biometric feature of each of the plurality of living body images and a registered biometric feature by using a determined position of the part of the authentication-target living body and perform authentication for the authentication-target living body according to a comparison result of comparing the biometric feature of each of the plurality of living body images and the registered biometric feature.

2. The biometric authentication apparatus according to claim 1, wherein the biometric sensor obtains the plurality of living body images continuously along the authentication-target living body, the shape sensor obtains a plurality of pieces of shape information continuously along the authentication-target living body, and the processor generates wide-area shape information of the authentication-target living body from the plurality of pieces of shape information and determines the position of the part of the authentication-target living body in the wide-area shape information of the authentication-target living body.

3. The biometric authentication apparatus according to claim 2, wherein the processor generates the wide-area shape information of the authentication-target living body from the plurality of pieces of shape information by using a surface image that corresponds to each of the plurality of living body images and that is obtained along a surface of the authentication-target living body.

4. The biometric authentication apparatus according to claim 2, wherein
    when registering the registered biometric feature, the biometric sensor obtains a plurality of living body images along a registration-target living body, the shape sensor obtains shape information corresponding to each of the plurality of living body images of the registration-target living body along the registration-target living body, and the processor generates wide-area shape information of the registration-target living body from the shape information corresponding to each of the plurality of living body images of the registration-target living body, determines, in the wide-area shape information of the registration-target living body, a position of a part of the registration-target living body captured in each of the plurality of living body images of the registration-target living body, registers as the registered biometric feature a biometric feature of a living body image in which the part of the registration-target living body is captured, and associates and registers the position of the part of the registration-target living body with the registered biometric feature;
    when authenticating the authentication-target living body, the processor performs alignment of the wide-area shape information of the authentication-target living body and the wide-area shape information of the registration-target living body and compares the biometric feature of each of the plurality of living body images of the authentication-target living body and the registered biometric feature by using the position of the part of the authentication-target living body and the position of the part of the registration-target living body.

5. A non-transitory computer-readable recording medium having stored therein a biometric authentication program that causes a computer to execute a process comprising:
    obtaining a plurality of living body images along an authentication-target living body by scanning the authentication-target living body while a position of the authentication-target living body relative to the biometric sensor is changing;
    obtaining, along the authentication-target living body, shape information corresponding to each of the plurality of living body images while the position of the authentication-target living body relative to the biometric sensor is changing;
    determining a position of a part of the authentication-target living body captured in each of the plurality of living body images, according to the shape information corresponding to each of the plurality of living body images;
    comparing a biometric feature of each of the plurality of living body images and a registered biometric feature by using a determined position of the part of the authentication-target living body; and
    performing authentication for the authentication-target living body according to a comparison result of comparing the biometric feature of each of the plurality of living body images and the registered biometric feature.

6. The non-transitory computer-readable recording medium according to claim 5, wherein
the obtaining the plurality of living body images and the shape image corresponding to each of the plurality of living body images obtains the plurality of living body images continuously along the authentication-target living body and a plurality of pieces of shape information continuously along the authentication-target living body; and
the determining the position of the part of the authentication-target living body captured in each of the plurality of living body images generates wide-area shape information of the authentication-target living body from the plurality of pieces of shape information, and determines the position of the part of the authentication-target living body in the wide-area shape image of the authentication-target living body.

7. The non-transitory computer-readable recording medium according to claim 6, wherein the determining the position of the part of the authentication-target living body captured in each of the plurality of living body images generates the wide-area shape information of the authentication-target living body from the plurality of pieces of shape information by using a surface image that corresponds to each of the plurality of living body images and that is obtained along a surface of the authentication-target living body.

8. The non-transitory computer-readable recording medium according to claim 6, wherein
when registering the registered biometric feature, the computer obtains a plurality of living body images along a registration-target living body, obtains shape information corresponding to each of the plurality of living body images of the registration-target living body along the registration-target living body, generates wide-area shape information of the registration-target living body from the shape information corresponding to each of the plurality of living body images of the registration-target living body, determines, in the wide-area shape information of the registration-target living body, a position of a part of the registration-target living body captured in each of the plurality of living body images, registers as the registered biometric feature a biometric feature of a living body image in which the part of the registration-target living body is captured, and associates and registers the position of the part of the registration-target living body with the registered biometric feature; and
when authenticating the authentication-target living body, the comparing the biometric feature of each of the plurality of living body images and the registered biometric feature performs alignment of the wide-area shape information of the authentication-target living body and the wide-area shape information of the registration-target living body, and compares the biometric feature of each of the plurality of living body images of the authentication-target living body and the registered biometric feature by using the position of the part of the authentication-target living body and the position of the part of the registration-target living body.

9. A biometric authentication method comprising:
obtaining a plurality of living body images along an authentication-target living body by scanning the authentication-target living body while a position of the authentication-target living body relative to the biometric sensor is changing;
obtaining, along the authentication-target living body, shape information corresponding to each of the plurality of living body images while the position of the authentication-target living body relative to the biometric sensor is changing;
determining, by a processor, a position of a part of the authentication-target living body captured in each of the plurality of living body images, according to the shape information corresponding to each of the plurality of living body images;
comparing, by the processor, a biometric feature of each of the plurality of living body images and a registered biometric feature by using a determined position of the part of the authentication-target living body; and
performing, by the processor, authentication for the authentication-target living body according to a comparison result of comparing the biometric feature of each of the plurality of living body images and the registered biometric feature.

10. The biometric authentication method according to claim 9, wherein
the obtaining the plurality of living body images and the shape image corresponding to each of the plurality of living body images obtains the plurality of living body images continuously along the authentication-target living body and a plurality of pieces of shape information continuously along the authentication-target living body; and
the determining the position of the part of the authentication-target living body captured in each of the plurality of living body images generates wide-area shape information of the authentication-target living body from the plurality of pieces of shape information, and determines the position of the part of the authentication-target living body in the wide-area shape information of the authentication-target living body.

11. The biometric authentication method according to claim 10, wherein the determining the position of the part of the authentication-target living body captured in each of the plurality of living body images generates the wide-area shape information of the authentication-target living body from the plurality of pieces of shape information by using a surface image that corresponds to each of the plurality of living body images and that is obtained along a surface of the authentication-target living body.

12. The biometric authentication method according to claim 10,
further comprising:
obtaining a plurality of living body images along a registration-target living body when registering the registered biometric feature;
obtaining shape information corresponding to each of the plurality of living body images of the registration-target living body along the registration-target living body;
generating wide-area shape information of the registration-target living body from the shape information corresponding to each of the plurality of living body images of the registration-target living body;
determining, in the wide-area shape information of the registration-target living body, a position of a part of the registration-target living body captured in each of the plurality of living body images of the registration-target living body;

registering as the registered biometric feature a biometric feature of a living body image in which the part of the registration-target living body is captured; and associating and registering the position of the part of the registration-target living body with the registered biometric feature, wherein the comparing the biometric feature of each of the plurality of living body images and the registered biometric feature performs alignment of the wide-area shape information of the authentication-target living body and the wide-area shape information of the registration-target living body when authenticating the authentication-target living body, and compares the biometric feature of each of the plurality of living body images of the authentication-target living body and the registered biometric feature by using the position of the part of the authentication-target living body and the position of the part of the registration-target living body.

* * * * *